US012490168B2

(12) United States Patent
Afzal et al.

(10) Patent No.: US 12,490,168 B2
(45) Date of Patent: *Dec. 2, 2025

(54) STATUS REGISTRATION OF PACKET ROUTING NODES

(71) Applicant: T-Mobile USA, Inc., Bellevue, WA (US)

(72) Inventors: Muhammad W. Afzal, Bellevue, WA (US); Suliman Albasheir, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 722 days.

This patent is subject to a terminal disclaimer.

(21) Appl. No.: 17/812,714

(22) Filed: Jul. 14, 2022

(65) Prior Publication Data

US 2022/0353782 A1 Nov. 3, 2022

Related U.S. Application Data

(63) Continuation of application No. 17/096,633, filed on Nov. 12, 2020, now Pat. No. 11,425,626.

(51) Int. Cl.
*H04W 40/04* (2009.01)
*H04W 40/12* (2009.01)
*H04W 40/28* (2009.01)
*H04W 76/10* (2018.01)

(52) U.S. Cl.
CPC ......... *H04W 40/04* (2013.01); *H04W 40/12* (2013.01); *H04W 40/28* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 9,807,669 B1 * | 10/2017 | Velusamy | H04L 12/66 |
| 11,425,626 B2 * | 8/2022 | Afzal | H04W 40/04 |
| 2018/0242196 A1 * | 8/2018 | Yang | H04W 28/088 |
| 2019/0223076 A1 * | 7/2019 | Albasheir | H04W 8/08 |
| 2020/0053828 A1 * | 2/2020 | Bharatia | H04W 76/11 |
| 2021/0014778 A1 * | 1/2021 | Xi | H04W 8/26 |
| 2022/0070757 A1 * | 3/2022 | He | H04W 28/0268 |
| 2022/0141718 A1 * | 5/2022 | Shekhar | H04W 36/12 370/331 |

\* cited by examiner

*Primary Examiner* — Brian S Roberts
(74) *Attorney, Agent, or Firm* — Foley IP Law, PLLC

(57) ABSTRACT

A solution for establishing a data traffic session for a user equipment (UE) on a network (e.g., a 4G or 5G cellular network) includes: receiving, by a session management node, from the UE, a request to set up the data traffic session; establishing the data traffic session with a first packet routing node; receiving, by the session management node, from a network repository or the first packet routing node, an indication of unavailability of the first packet routing node to handle UE data traffic; and based on at least a status of the first packet routing node changing from available to handle UE data traffic to unavailable to handle UE data traffic, moving the data traffic session to the available alternate packet routing node.

17 Claims, 6 Drawing Sheets

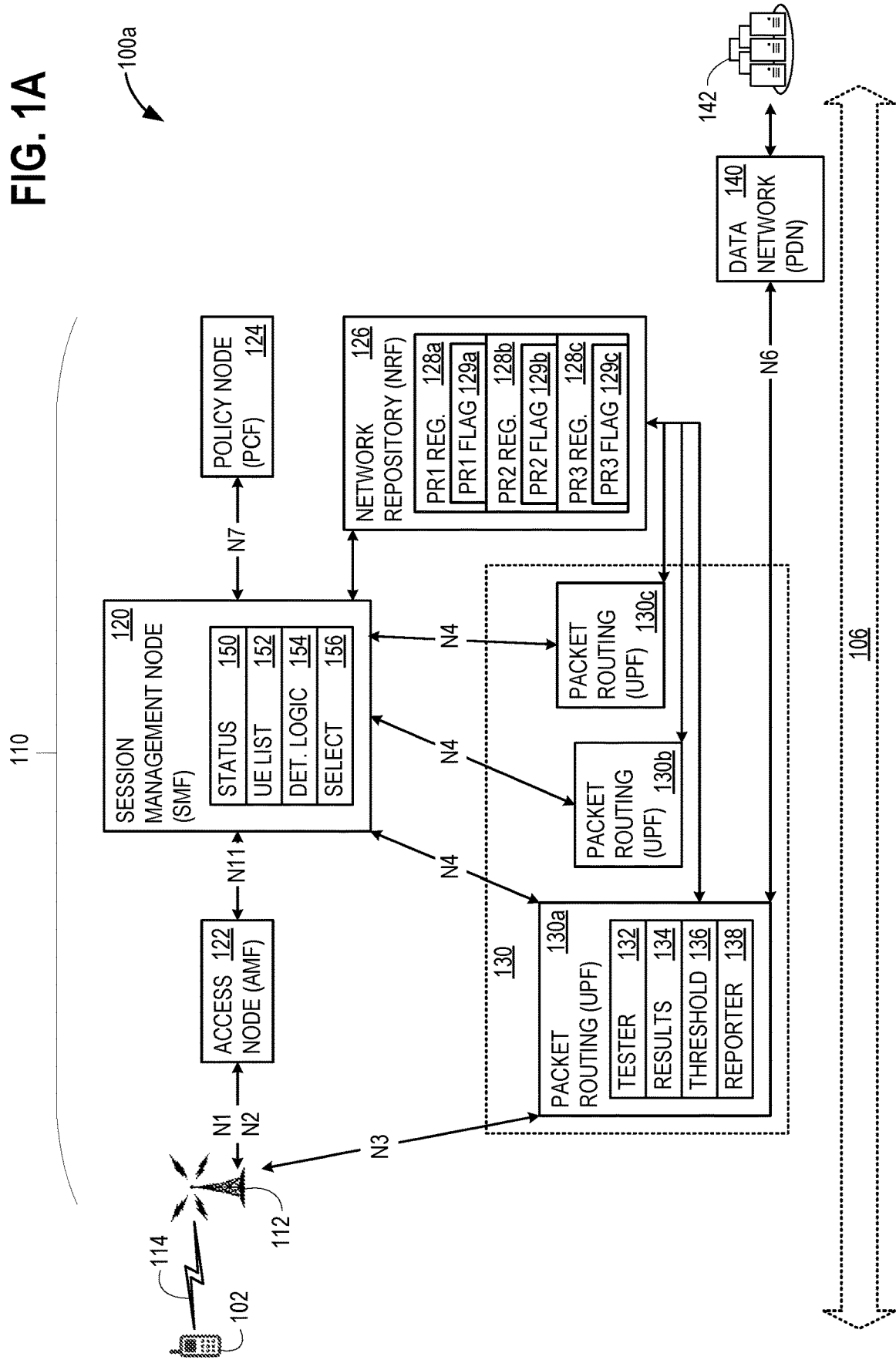

STATUS REGISTRATION OF PACKET ROUTING NODES

CROSS-REFERENCE TO RELATED APPLICATION

This application is a continuation application of and claims priority to U.S. patent application Ser. No. 17/096,633, entitled "STATUS REGISTRATION OF PACKET ROUTING NODES," filed on Nov. 12, 2020, the disclosure of which is incorporated herein by reference in its entirety.

BACKGROUND

After a packet routing node registers with a network repository, a session management node is able to assign the packet routing node to handle data traffic between a user equipment (UE, cellular device) and a packet data network (PDN, e.g., a portion of the internet). The UE uses the PDN to reaches a network resource node. However, if the packet routing node becomes unavailable, or is otherwise unable to properly handle the UE's data traffic, the session management node may yet continue to assign the packet routing node to other UEs, resulting in delays and degraded experiences for those other UEs. In fifth generation (5G) cellular networks, the packet routing node may include a user plane function (UPF); the network repository may include a network function repository function (NRF); and the session management node may include a session management function (SMF) node. In fourth generation (4G) cellular networks, the packet routing node may include a packet data network gateway (PGW, or a PGW user plane function, PGW-U); the network repository may include a domain name system (DNS) server; and the session management node may include a PGW control plane function (PGW-C).

SUMMARY

The following summary is provided to illustrate examples disclosed herein, but is not meant to limit all examples to any particular configuration or sequence of operations.

A solution for establishing a data traffic session for a user equipment (UE) on a network (e.g., a fifth generation (5G) cellular network or fourth generation (4G) cellular network) includes: receiving, by a session management node, from the UE, a request to set up the data traffic session; establishing the data traffic session with a first packet routing node; receiving, by the session management node, from a network repository or the first packet routing node, an indication of unavailability of the first packet routing node to handle UE data traffic; and based on at least a status of the first packet routing node changing from available to handle UE data traffic to unavailable to handle UE data traffic, moving the data traffic session to the available alternate packet routing node. In 5G, the packet routing node may include a user plane function (UPF); the network repository may include a network function repository function (NRF); and the session management node may include a session management function (SMF) node. In 4G, the packet routing node may include a packet data network gateway (PGW, or a PGW user plane function, PGW-U); the network repository may include a domain name system (DNS) server; and the session management node may include a PGW control plane function (PGW-C). In some examples, the network resource node is reached via a packet data network (PDN), for example, a portion of the internet.

BRIEF DESCRIPTION OF THE DRAWINGS

The disclosed examples are described below with reference to the accompanying drawing figures listed below, wherein:

FIG. 1A illustrates an exemplary arrangement that may advantageously establish a data traffic session for a user equipment (UE) on a network, using status registration of packet routing nodes;

Figure 1B:
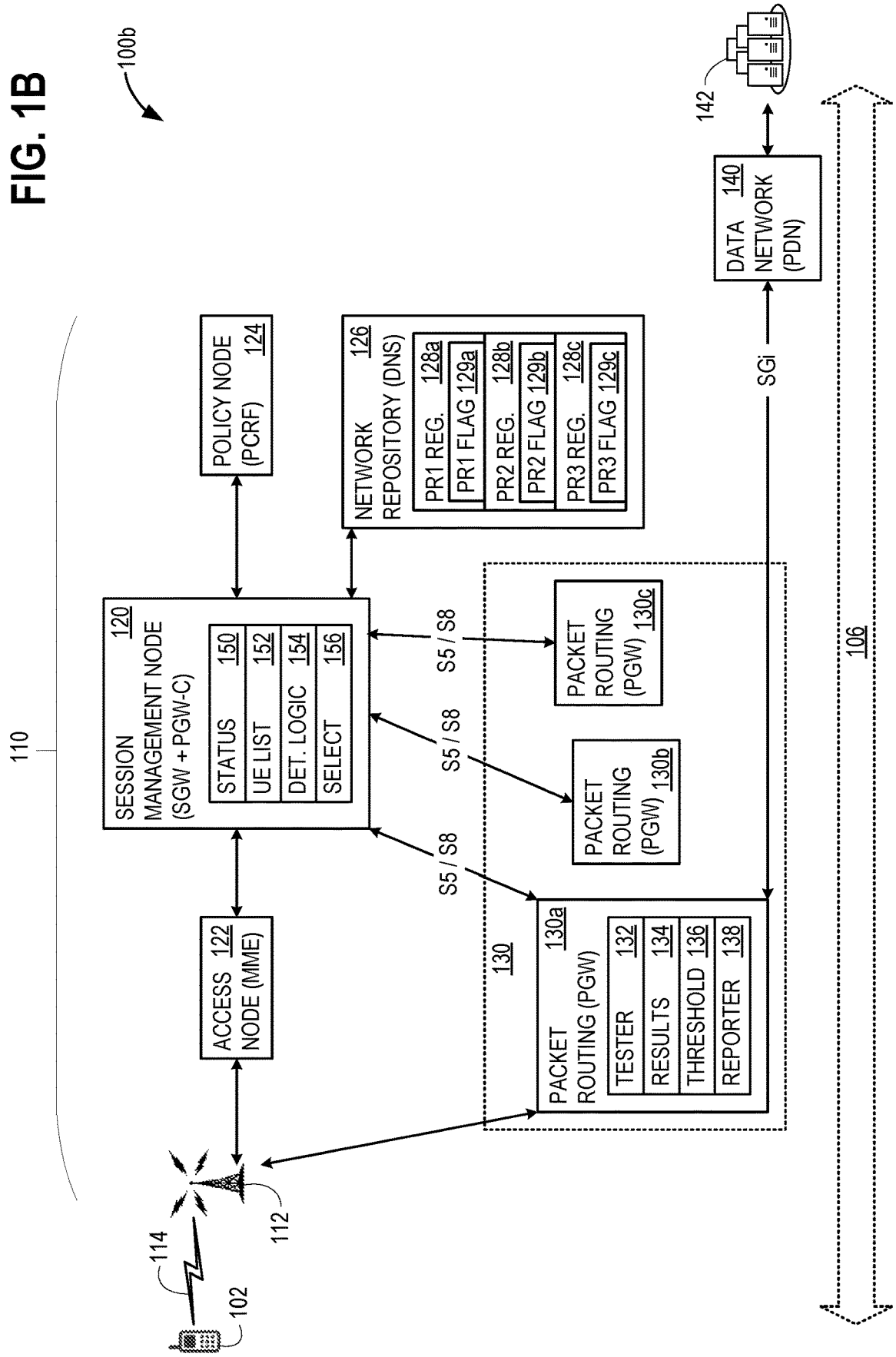
FIG. 1B illustrates an alternative exemplary arrangement that may advantageously establish a data traffic session for a UE on a network, using status registration of packet routing nodes.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for establishing a data traffic session for a user equipment (UE) on a network (e.g., a fifth generation (5G) cellular network or fourth generation (4G) cellular network) includes: receiving, by a session management node, from the UE, a request to set up the data traffic session; determining, by the session management node, an availability (reaching an acceptable performance threshold) or unavailability (not reaching an acceptable performance threshold) of a first packet routing node to handle UE data traffic, wherein determining the availability or unavailability of the first packet routing node to handle UE data traffic comprises receiving an indication of the availability or unavailability of the first packet routing node from a network repository; based on at least on determining that the first packet routing node is available to handle UE data traffic, establishing the data traffic session with the first packet routing node; and based on at least on determining that the first packet routing node is unavailable to handle UE data traffic, establishing the data traffic session with an available alternate packet routing node. In 5G, the packet routing node may include a user plane function (UPF); the network repository may include a network function repository function (NRF); and the session management node may include a session management function (SMF) node. In 4G, the packet routing node may include a packet data network gateway (PGW, or a PGW user plane function, PGW-U); the network repository may include a domain name system (DNS) server; and the session management node may include a PGW control plane function (PGW-C). In some examples, a network resource node (e.g., the endpoint of the data traffic session) is reached via a packet data network (PDN), for example, a portion of the internet.

Aspects of the disclosure improve the speed and reliability of cellular data sessions by determining, by a session management node, an availability or unavailability of a first packet routing node to handle UE data traffic, and based on at least on determining that the first packet routing node is unavailable to handle UE data traffic, establishing the data traffic session with an available alternate packet routing node. This prevents wasting timeout periods attempting to establishing the data traffic session with the first packet routing node.

The packet routing node detects the performance of its interface with the PDN (e.g., an N6 interface, for 5G) and its registration status with a network repository indicates the status to the session management node. This way, the session management node is provided with timely status of the packet routing node's ability to handle UE data traffic. In some examples, the packet routing node also pushes its status the session management node, for example, if the packet routing node detects that the performance of its interface with the PDN has deteriorated or its service health has otherwise deteriorated.

In some examples, the packet routing node will register itself with the network repository only if it is available to handle UE data traffic, but de-register itself with the network repository when it becomes unavailable to handle UE data traffic. This way the availability or unavailability of the packet routing node may be determined by whether it is registered at all. In some examples, the packet routing node will register itself with the network repository using a flag to indicate whether it is available to handle UE data traffic or unavailable to handle UE data traffic. In such examples, the availability or unavailability of the packet routing node may be determined by the flag associated with its registration.

With reference now to the figures, FIG. 1A illustrates an exemplary arrangement 100a that may advantageously establish a data traffic session 106 for a UE 102 on a network 110, using status registration of packet routing nodes 130a, 130b, and 130c (together, a plurality of packet routing nodes 130). Network 110 may be a fifth generation (5G) cellular network, or another type of network. FIG. 1B illustrates an exemplary arrangement 100b in which components of network 110 are represented as a fourth generation (4G) cellular network, although with operations and components otherwise corresponding with those of arrangement 100a.

A UE 102 is attempting to set up data traffic session 106 in order to reach a network resource node 142 across a PDN 140. Network resource node 142 may be, for example, a data source located in the internet. UE 102 will be able to reach network resource node 142 using an air interface 114 with RAN 112, then through a packet routing node (which is to be determined) that is in communication with PDN 140. In 5G, each of packet routing nodes 130a, 130b, and 130c includes a UPF; RAN 112 communicates with a UPF (packet routing node) via an N3 interface; and a UPF communicates with PDN 140 via an N6 interface. Although additional detail is shown for packet routing node 130a, it should be understood that packet routing node 130b and packet routing node 130c may be similarly configured.

When setting up data traffic session 106, UE 102 sends a request to a session management node 120, via RAN 112 and an access node 122. Session management node 120 queries a policy node 124 to determine whether the request is permitted and, if so, queries a network repository 126 to discover packet routing nodes (e.g., packet routing nodes 130a, 130b, and 130c) to assign to UE 102 for handling data traffic session 106. In 5G, access node 122 includes an access and mobility management function (AMF) node; session management node 120 includes an SMF node; policy node 124 includes a policy charging function (PCF) node; and network repository 126 includes an NRF. Also in 5G, UE 102 and RAN 112 communicate with access node 122 via an N1 and/or an N2 interface; access node 122 communicates with session management node 120 via an N11 interface; and session management node 120 communicates with policy node 124 via an N7 interface. Session management node 120 also communicates with each of packet routing nodes 130a, 130b, and 130c via an N4 interface.

As disclosed herein, session management node 120 selects one of packet routing nodes 130a, 130b, and 130c to assign to UE 102 for handling data traffic session 106, based on availability. This sets up a default evolved packet system (EPS) bearer between UE 102 and PDN 140, with the selected packet routing node providing a point of exit and entry of external packet data traffic for the UE (e.g., external to network 110). There exist multiple ways that a packet routing node may become unavailable. There may be a transport failure, such as the N6 interface fails, and PDN 140 becomes non-responsive to the packet routing node, even if the N6 interface is still functioning properly.

FIG. 1B illustrates an alternative exemplary arrangement 100b that may advantageously establish data traffic session 106 for UE 102 on a network 110b, using status registration of packet routing nodes 130a, 130b, and 130c. Network 110b may be a 4G cellular network, or another type of network. In 4G, each of packet routing nodes 130a, 130b, and 130c includes a PGW; access node 122 includes a Mobility Management Entity (MME) node; session management node 120 includes a serving gateway (SGW) and/or a PGW-C; access node 122 includes a policy and charging rules function (PCRF) node; and network repository 126 includes a DNS server. Also in 4G, session management node 120 communicates with a PGW via an S5 (home network) or S8 (roaming) interface; and a PGW communicates with PDN 140 via an SGi interface. In 4G, there may not be direct communication between a PGW and a DNS server.

Figure 2:
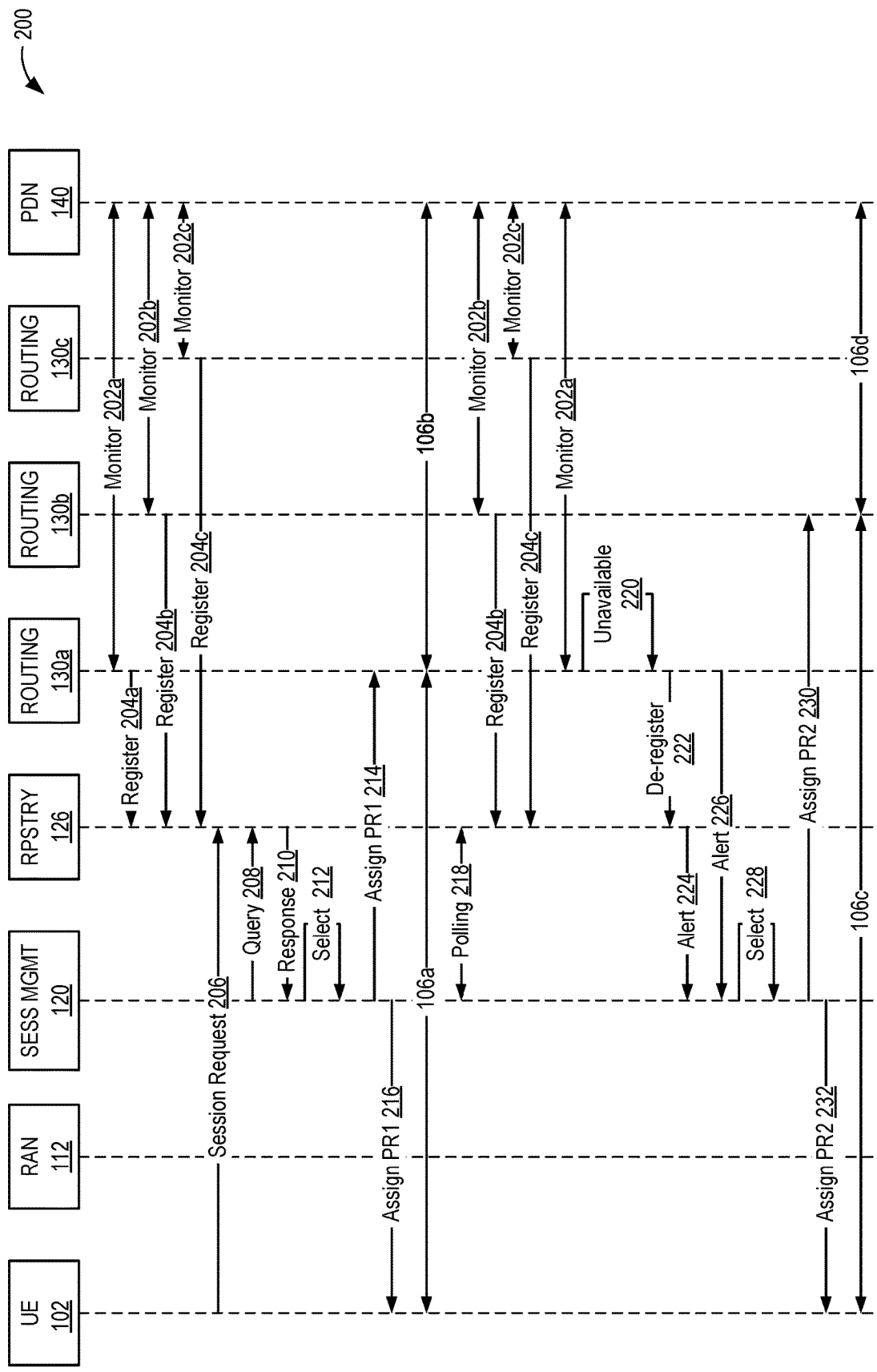
FIG. 2 illustrates a messaging sequence that may be used within the arrangement of FIG. 1.
Figure 3:
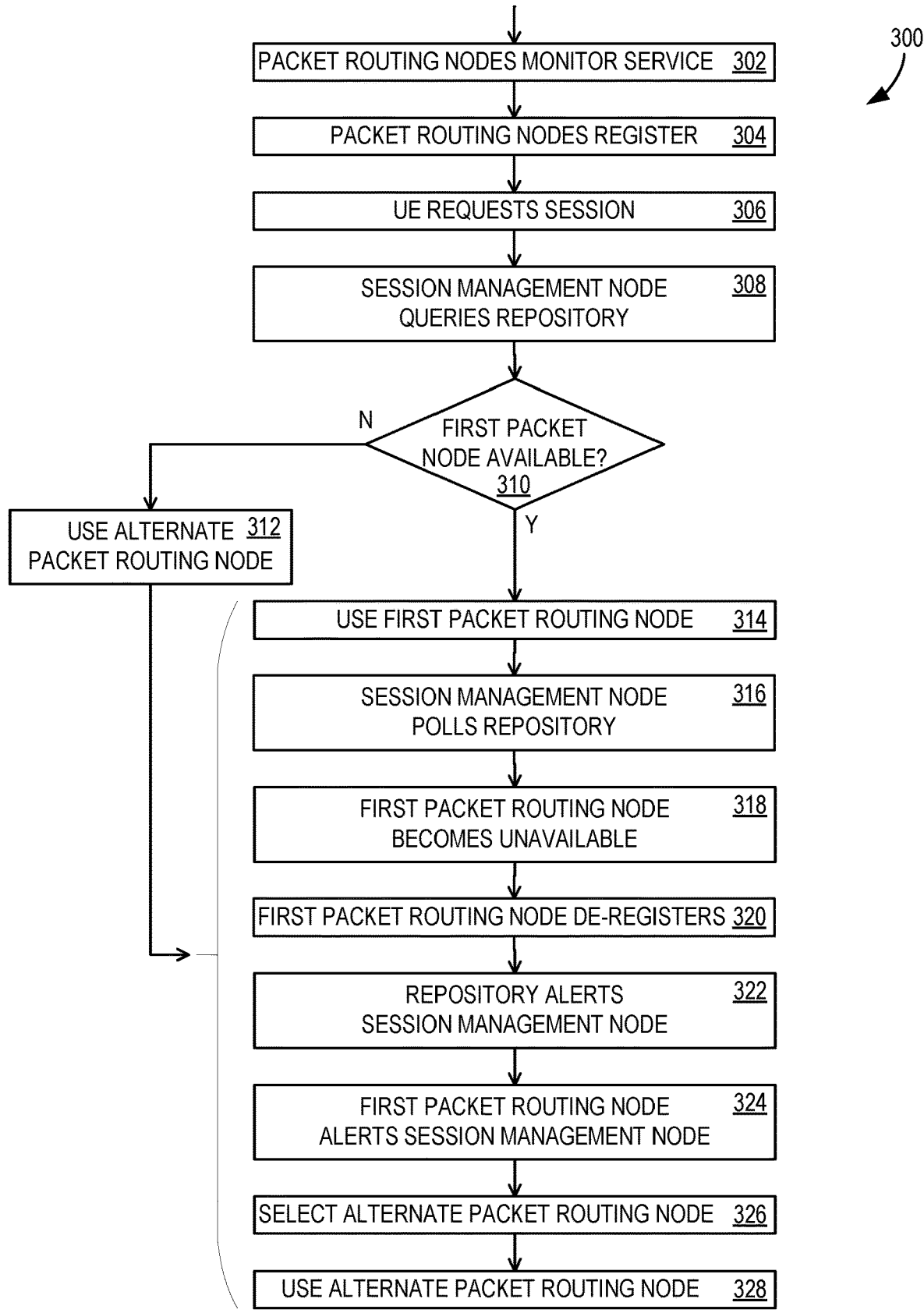
FIG. 3 illustrates a flow chart of exemplary operations associated with the arrangements of FIGS. 1A and 1B.

Further description of FIGS. 1A and 1B will be made with additional reference to FIGS. 2 and 3. FIG. 2 is a messaging sequence diagram 200 that shows a series of messages may be used within arrangement 100a and/or arrangement 100b, and is described in conjunction with FIG. 3. FIG. 3 illustrates a flow chart 300 of exemplary operations associated with initiating a network session for UE 102 on network 110, and the messages of messaging sequence diagram 200 occur during various operations of flow chart 300. In some examples, at least a portion of messaging sequence diagram 200 and at least a portion of flow chart 300 may each be performed using one or more computing devices 500 of FIG. 5. FIGS. 1A-3 should be viewed together.

Operation 302 (FIG. 3) includes monitoring a service performance between packet routing node 130a (a first packet routing node) and PDN 140. This is an ongoing operation, and is performed using message 202a. For example, any or all of a ping test, uplink and/or downlink flow statistics, and border gateway protocol (BGP) peer status may be used. In some examples, packet routing node 130a comprises a UPF node. In some examples, packet routing node 130a comprises a PGW. In some examples, a UPF node communicates with PDN 140 using an N6 interface. In some examples, packet routing node 130a comprises a PGW user plane function (PGW-U) node. In some examples, a PGW communicates with PDN 140 using an SGi interface. In some examples, PDN 140 comprises at least a portion of a public internet.

Also included in operation 302 is monitoring a service performance between packet routing node 130b (a second packet routing node that provides an alternate packet routing node to packet routing node 130a) and PDN 140; and monitoring a service performance between packet routing node 130c (yet another alternate packet routing node) and PDN 140. These operations are also ongoing, and use messages 202b and 202c, respectively. Operation 302 uses a tester 132 that collects results 134 for the performance of packet routing node 130a.

Operation 304 includes based on at least the service performance between packet routing node 130a and PDN 140 meeting performance threshold 136, indicating, by packet routing node 130a, to network repository 126, the availability or unavailability of packet routing node 130a to handle UE data traffic. In some examples, a reporter 138 compares results 134 with performance threshold 136, and makes a binary determination of available or unavailable. In some examples, reporter 138 does not make a binary determination, but instead provides a descriptive version of results 134 to network repository 126, which appear as packet routing node 1 (PR1) availability flag 129a in PR1 registration 128a. Similarly, equivalent reporters in 5G packet routing nodes 130b and 130c may report descriptive testing results to network repository 126, which appear as packet routing node 2 (PR2) availability flag 129b in PR2 registration 128b, and as packet routing node 3 (PR3) availability flag 129c in PR3 registration 128c, respectively. Descriptive testing results may include latency, throughput (bandwidth), and/or bit error rate (BER). In 4G, a DNS server may obtains corresponding information from PGWs indirectly.

In some examples, indicating the availability or unavailability of packet routing node 130a to handle UE data traffic comprises, based at least on packet routing node 130a being available to handle UE data traffic, registering packet routing node 130a with network repository 126. In such examples, reporter 138 only registers packet routing node 130a with network repository 126 if packet routing node 130a is available to handle UE data traffic (e.g., results 134 meet performance threshold 136), but does not register packet routing node 130a with network repository 126 if packet routing node 130a is unavailable to handle UE data traffic. In such examples, indicating the availability or unavailability of packet routing node 130a to handle UE data traffic comprises, based at least on packet routing node 130a being unavailable to handle UE data traffic, de-registering packet routing node 130a with network repository 126, if packet routing node 130a had been previously registered.

In some examples, indicating the availability or unavailability of packet routing node 130a to handle UE data traffic comprises, based at least on packet routing node 130a being available to handle UE data traffic, registering packet routing node 130a with network repository 126 with PR1 availability flag 129a. In such examples, indicating the availability or unavailability of packet routing node 130a to handle UE data traffic comprises, based at least on packet routing node 130a being unavailable to handle UE data traffic, registering packet routing node 130a with network repository 126 with PR1 availability flag 129a. Thus, in some examples, reporter 138 registers packet routing node 130a with network repository 126 whether packet routing node 130a is available or unavailable, and indicates availability or unavailability using PR1 availability flag 129a. In some examples, PR1 availability flag 129a is binary, although in some examples, PR1 availability flag 129a may be descriptive (so that session management makes a determination whether to use packet routing node 130a using the description in PR1 availability flag 129a).

The registration of packet routing node 130a appears within network repository 126 as PR1 registration 128a, and may include PR1 availability flag 129a (as described above). Similarly, the registrations of packet routing nodes 130b and 130c may be similar. For example, the registration of packet routing node 130b appears within network repository 126 as PR2 registration 128b, and may include PR2 availability flag 129b, and the registration of packet routing node 130c appears within network repository 126 as PR3 registration 128c, and may include PR3 availability flag 129c. For example, operation 304 includes, based on at least the service performance between packet routing node 130b and PDN 140 meeting its performance threshold (equivalent to performance threshold 136), indicating, by packet routing node 130b, to network repository 126, the availability or unavailability of packet routing node 130b to handle UE data traffic. The registrations, which may include descriptions of performance, are accomplished using registration messages 204a, 204b, and 204c. In some examples, network repository 126 comprises an NRF node. In some examples, network repository 126 comprises a DNS server.

UE sends a session request 206 to session management node 120, in order to initiate data traffic session 106, in operation 306. Operation 306 thus includes receiving, by session management node 120, from UE 102, a request to set up data traffic session 106. In some examples, session management node 120 comprises an SMF node. In some examples, session management node 120 comprises a PGW-C node and/or a serving gateway (SGW). In some examples, an SGW communicates with a PGW using an S5/S8 interface. In some examples, receiving, by session management node 120, from UE 102, the request to set up data traffic session 106 comprises receiving the request through access node 122. In some examples, access node 122 comprises an AMF node. In some examples, access node 122 comprises an MME node.

In operation 308 session management node 120 queries network repository 126 with a resource discovery message 208, and network repository 126 responds with a message 210 that includes any of PR1 registration 128a, PR1 availability flag 129a, PR2 registration 128b, PR2 availability flag 129b, PR3 registration 128c, and PR3 availability flag 129c that it has in its current registration data. Since the registrations identify the corresponding packet routing nodes, in some examples, operation 308 includes receiving, by session management node 120, from network repository 126, identification of packet routing node 130a, packet routing node 130b, and packet routing node 130c. Any of PR1 registration 128a, PR1 availability flag 129a, PR2 registration 128b, PR2 availability flag 129b, PR3 registration 128c, and PR3 availability flag 129c that session management node 120 receives from network repository 126 is stored as packet routing node status 150.

In decision operation 310 (shown as selection 212 in FIG. 2) session management node 120 uses determination logic 154 to determine (from status 150) whether to assign packet routing node 130a or packet routing node 130b or UE 102. Decision operation 310 thus includes determining, by session management node 120, an availability or unavailability of packet routing node 130a to handle UE data traffic. In some examples, determining the availability or unavailability of packet routing node 130a to handle UE data traffic comprises receiving an indication of the availability or unavailability of packet routing node 130a from network repository 126. Based on the determination of whether packet routing node 130a is available, selection logic 156 selects packet routing node 130a or packet routing node 130b (if packet routing node 130b is available, as determined by determination logic 154. In some scenarios, if determination logic 154 determines that packet routing node 130a and packet routing node 130b are both unavailable, but packet routing node 130c is available, selection logic 156 will select packet routing node 130c. In some examples, determination logic 154 uses the presence or absence of a registration of a packet routing node; in some examples, determination logic 154 uses a binary flag within a registration of a packet routing node; and some examples, determination logic 154 uses a descriptive flag within a registration of a packet routing node.

If packet routing node 130a is unavailable to handle UE data traffic (but packet routing node 130b is available), session management node 120 will use packet routing node 130b for data traffic session, as shown in operation 312. Operation 312 includes based on at least on determining that packet routing node 130a is unavailable to handle UE data traffic, establishing data traffic session 106 with packet routing node 130b (an available alternate packet routing node). In this case, subsequent operations 314-328 are performed as described below, but substituting packet routing node 130b for packet routing node 130a, and with packet routing node 130a or packet routing node 130c being the alternate packet routing node.

If packet routing node 130a is available, operation 314 includes, based on at least on determining that packet routing node 130a is available to handle UE data traffic, establishing data traffic session 106 with packet routing node 130a. This includes session management node 120 sending message 216 to UE 102 and message 214 to packet routing node 130a. Data traffic session 106 then enters a first phase in which it includes segment 106a between UE 102 and packet routing node 130a, and segment 106b between packet routing node 130a and PDN 140.

However, it is possible that the performance of that packet routing node 130a may degrade, for one of the reasons described above. Thus, in some examples, operation 316 includes repeatedly polling, by session management node 120, network repository 126 to determine whether the status of packet routing node 130a (or any other packet routing node) is changed from available to handle UE data traffic to unavailable to handle UE data traffic. This is shown as message 218. Along with this, packet routing nodes 130a, 130b, and 130c each continues monitoring its service performance with PDN 140. As indicated in FIG. 2, message 202b and message 202c provide successful testing results, so that packet routing nodes 130b and 130c retain their registrations with network repository 126. In some examples, registration message 204b and registration message 204c are unnecessary, if packet routing nodes 130b and 130c had already been registered. In some examples, registration messages 204b and 204c update descriptive performance data (e.g., latency, throughput, BER) for packet routing nodes 130b and 130c. In some examples, ongoing registration messages are used as a heartbeat signal and if network repository 126 detects a missing registration message after a timeout period, it updates the registration information to indicate that the corresponding packet routing node is unavailable.

As shown for packet routing node 130a, monitoring has failed. After a timeout period, packet routing node 130a determines that it has become unavailable at 318 (shown as unavailability determination 220 in FIG. 2). Operation 320 includes based on at least a status of packet routing node 130a changing from available to handle UE data traffic to unavailable to handle UE data traffic, indicating, by packet routing node 130a, to network repository 126, the unavailability of packet routing node 130a to handle UE data traffic. In some examples, packet routing node 130a deregisters with network repository 126 using message 222. In such examples, indicating the availability or unavailability of packet routing node 130a to handle UE data traffic comprises, based at least on packet routing node 130a being unavailable to handle UE data traffic, de-registering packet routing node 130a with network repository 126. In some examples, packet routing node 130a maintains its registration (e.g., PR1 registration 128a remains at network repository 126), but updates PR1 availability flag 129a within PR1 registration 128a.

In some examples, network repository 126 pushes an alert 224 to session management node 120. Operation 322 includes, based on at least a status of packet routing node 130a changing from available to handle UE data traffic to unavailable to handle UE data traffic, indicating, by network repository 126, to session management node 120, the unavailability of packet routing node 130a to handle UE data traffic. In some examples, packet routing node 130a pushes its own alert 226 to session management node 120. Operation 324 includes, based on at least a status of packet routing node 130a changing from available to handle UE data traffic to unavailable to handle UE data traffic, indicating, by packet routing node 130a, to session management node 120, the unavailability of packet routing node 130a to handle UE data traffic. In some examples (5G), a UPF node communicates with session management node 120 using an N4 interface.

Session management node 120 selects an alternate packet routing node, such as packet routing node 130b in operation 326 (shown as selection 228 in FIG. 2). Operation 328 includes based on at least the status of packet routing node 130a changing from available to handle UE data traffic to unavailable to handle UE data traffic, moving data traffic session 106 to packet routing node 130b. This includes session management node 120 sending message 232 to UE 102 and message 230 to packet routing node 130a. Data traffic session 106 then enters another phase in which it includes segment 106c between UE 102 and packet routing node 130b, and segment 106d between packet routing node 130b and PDN 140. Session management node 120 also moves other UEs that had been using packet routing node 130a, as indicated within its assignment list 152. When later session requests arrive from other UEs, session management node 120 will not assign packet routing node 130a until after packet routing node 130a has initiated its availability again on network repository 126.

Figure 4:
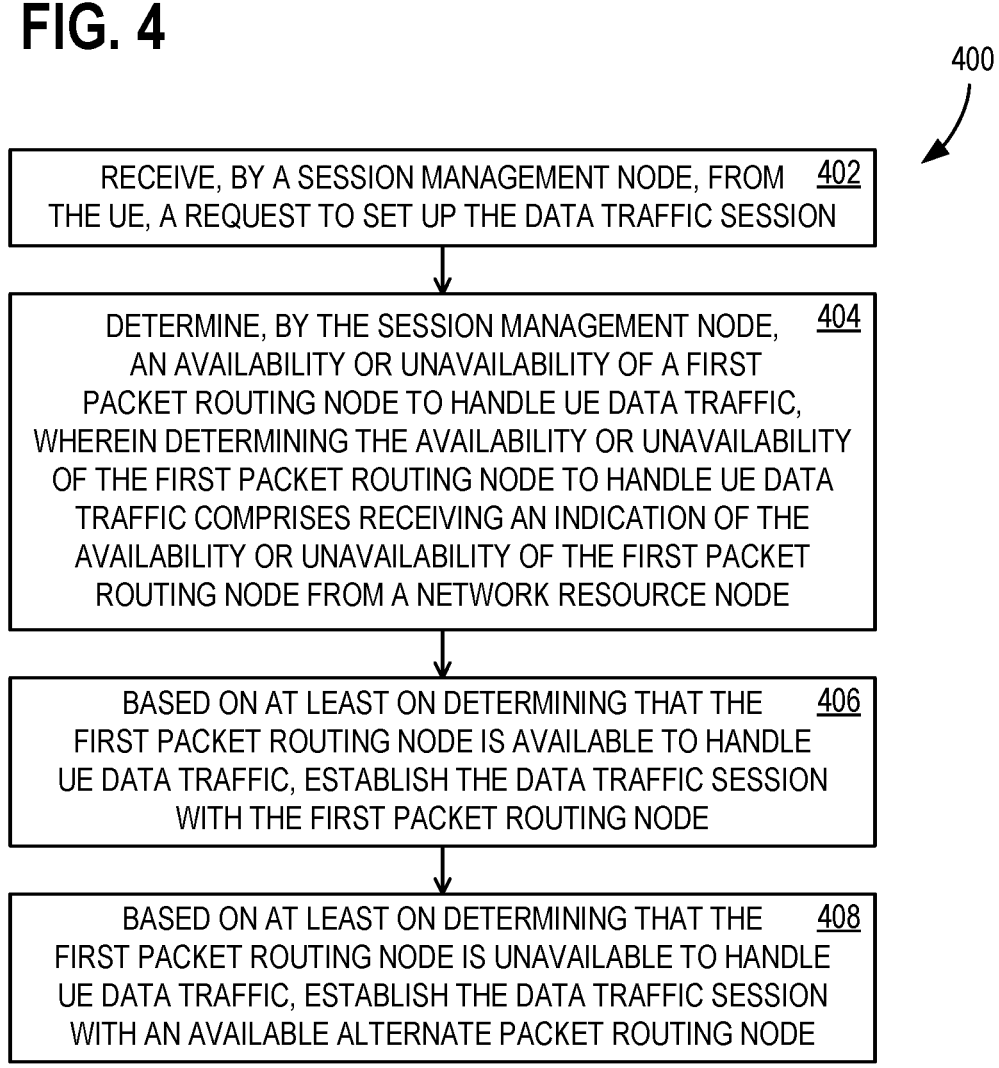
FIG. 4 illustrates another flow chart of exemplary operations associated with the arrangements of FIGS. 1A and 1B.

FIG. 4 illustrates a flow chart 400 of exemplary operations associated with establishing a data traffic session for a UE on a network. In some examples, at least a portion of flow chart 400 may be performed using one or more computing devices 500 of FIG. 5. Operation 402 includes receiving, by a session management node, from the UE, a request to set up the data traffic session. Operation 404 includes determining, by the session management node, an availability or unavailability of a first packet routing node to handle UE data traffic, wherein determining the availability or unavailability of the first packet routing node to handle UE data traffic comprises receiving an indication of the availability or unavailability of the first packet routing node from a network repository. Operation 406 includes, based on at least on determining that the first packet routing node is available to handle UE data traffic, establishing the data traffic session with the first packet routing node. Operation 408 includes, based on at least on determining that the first packet routing node is unavailable to handle UE data traffic, establishing the data traffic session with an available alternate packet routing node.

Figure 5:
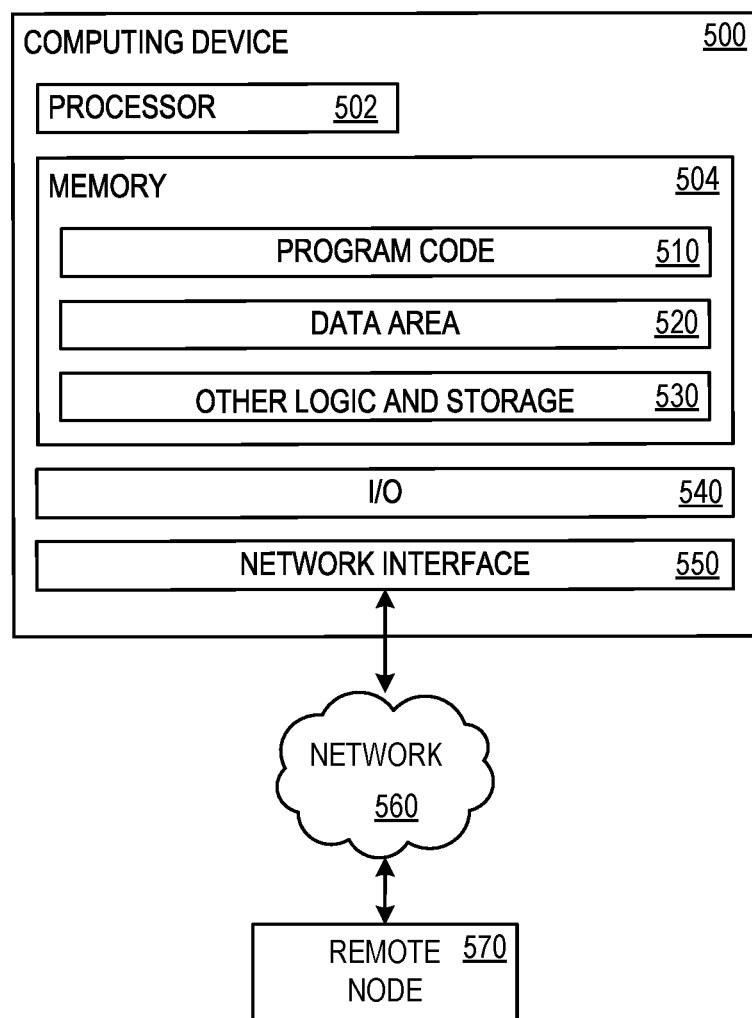
FIG. 5 illustrates a block diagram of a computing device that may be used as a component of the arrangements illustrated in FIGS. 1A and 1B.

FIG. 5 illustrates a block diagram of computing device 500 that may be used as a component of arrangement 100a of FIG. 1A and/or arrangement 100b of FIG. 1B, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

ADDITIONAL EXAMPLES

An exemplary system for establishing a data traffic session for a UE on a network comprises: a processor; and a computer-readable medium storing instructions that are operative upon execution by the processor to: receive, by a session management node, from the UE, a request to set up the data traffic session; determine, by the session management node, an availability or unavailability of a first packet routing node to handle UE data traffic, wherein determining the availability or unavailability of the first packet routing node to handle UE data traffic comprises receiving an indication of the availability or unavailability of the first packet routing node from a network repository; based on at least on determining that the first packet routing node is available to handle UE data traffic, establish the data traffic session with the first packet routing node; and based on at least on determining that the first packet routing node is unavailable to handle UE data traffic, establish the data traffic session with an available alternate packet routing node.

An exemplary method of establishing a data traffic session for a UE on a network comprises: receiving, by a session management node, from the UE, a request to set up the data traffic session; determining, by the session management node, an availability or unavailability of a first packet routing node to handle UE data traffic, wherein determining the availability or unavailability of the first packet routing node to handle UE data traffic comprises receiving an indication of the availability or unavailability of the first packet routing node from a network repository; based on at least on determining that the first packet routing node is available to handle UE data traffic, establishing the data traffic session with the first packet routing node; and based on at least on determining that the first packet routing node is unavailable to handle UE data traffic, establishing the data traffic session with an available alternate packet routing node.

One or more exemplary computer storage devices has computer-executable instructions stored thereon, which, upon execution by a computer, cause the computer to perform operations comprising: receiving, by a session management node, from a UE, a request to set up a data traffic session; determining, by the session management node, an availability or unavailability of a first packet routing node to handle UE data traffic, wherein determining the availability or unavailability of the first packet routing node to handle UE data traffic comprises receiving an indication of the availability or unavailability of the first packet routing node from a network repository; based on at least on determining that the first packet routing node is available to handle UE data traffic, establishing the data traffic session with the first packet routing node; and based on at least on determining that the first packet routing node is unavailable to handle UE data traffic, establishing the data traffic session with an available alternate packet routing node.

Alternatively, or in addition to the other examples described herein, examples include any combination of the following:
  based on at least a status of the first packet routing node changing from available to handle UE data traffic to unavailable to handle UE data traffic, moving the data traffic session to the available alternate packet routing node;
  monitoring a service performance between the first packet routing node and a PDN;
  based on at least the service performance between the first packet routing node and the PDN meeting a performance threshold, indicating, by the first packet routing node, to the network repository, the availability or unavailability of the first packet routing node to handle UE data traffic;
  indicating the availability or unavailability of the first packet routing node to handle UE data traffic comprises, based at least on the first packet routing node being available to handle UE data traffic, registering the first packet routing node with the network repository;
  indicating the availability or unavailability of the first packet routing node to handle UE data traffic comprises, based at least on the first packet routing node being available to handle UE data traffic, registering the first packet routing node with the network repository with an availability flag;
  indicating the availability or unavailability of the first packet routing node to handle UE data traffic comprises, based at least on the first packet routing node being unavailable to handle UE data traffic, de-registering the first packet routing node with the network repository;
  indicating the availability or unavailability of the first packet routing node to handle UE data traffic comprises, based at least on the first packet routing node being unavailable to handle UE data traffic, registering the first packet routing node with the network repository with an unavailability flag;
  based on at least a status of the first packet routing node changing from available to handle UE data traffic to unavailable to handle UE data traffic, indicating, by the first packet routing node, to the network repository, the unavailability of the first packet routing node to handle UE data traffic;
based on at least a status of the first packet routing node changing from available to handle UE data traffic to unavailable to handle UE data traffic, indicating, by the first packet routing node, to the session management node, the unavailability of the first packet routing node to handle UE data traffic;
the first packet routing node comprises a UPF node;
the network repository comprises an NRF node;
the session management node comprises an SMF node;
a UPF node communicates with the PDN using an N6 interface;
the first packet routing node comprises a PGW;
the first packet routing node comprises a PGW-U node;
the network repository comprises a DNS server;
the session management node comprises a PGW-C node;
the session management node comprises an SGW;
a PGW communicates with the PDN using an SGi interface;
the PDN comprises at least a portion of a public internet;
a UPF node communicates with the SMF using an N4 interface;
a SGW communicates with a PGW using an S5/S8 interface;
receiving, by the session management node, from the UE, the request to set up the data traffic session comprises receiving the request through an access node;
the access node comprises an AMF node;
the access node comprises an MME node;
receiving, by the session management node, from the network repository, identification of the available alternate packet routing node;
based on at least a status of the first packet routing node changing from available to handle UE data traffic to unavailable to handle UE data traffic, indicating, by the network repository, to the session management node, the unavailability of the first packet routing node to handle UE data traffic; and
repeatedly polling, by the session management node, the network repository to determine whether the status of the first packet routing node is changed from available to handle UE data traffic to unavailable to handle UE data traffic.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of establishing a data traffic session for a user equipment (UE) on a network, the method comprising:
    receiving, by a session management node, from the UE, a request to set up the data traffic session;
    establishing the data traffic session with a first packet routing node;
    receiving, by the session management node, from a network repository or the first packet routing node, an indication of unavailability of the first packet routing node to handle UE data traffic;
    based on at least a status of the first packet routing node changing from available to handle UE data traffic to unavailable to handle UE data traffic, moving the data traffic session to an available first alternate packet routing node;
    monitoring a service performance between the first alternate packet routing node and a packet data network (PDN); and
    based on at least the service performance between the first alternate packet routing node and the PDN meeting a performance threshold, indicating, by the first alternate packet routing node, to the network repository, the availability or unavailability of the first alternate packet routing node to handle UE data traffic.

2. The method of claim 1, wherein the indication of unavailability of the first packet routing node to handle UE data traffic is received from the network repository.

3. The method of claim 1, wherein the indication of unavailability of the first packet routing node to handle UE data traffic is received from the first packet routing node.

4. The method of claim 1, wherein indicating the availability or unavailability of the first alternate packet routing node to handle UE data traffic comprises:
    based at least on the first alternate packet routing node being available to handle UE data traffic:
        registering the alternate first packet routing node with the network repository, or
        registering the first alternate packet routing node with the network repository with an availability flag; and
    based at least on the first alternate packet routing node being unavailable to handle UE data traffic:
        de-registering the first alternate packet routing node with the network repository, or
        registering the first alternate packet routing node with the network repository with an unavailability flag.

5. The method of claim 1,
    wherein the first alternate packet routing node comprises a user plane function (UPF) node;
    wherein the network repository comprises a network function repository function (NRF) node;
    wherein the session management node comprises a session management function (SMF) node; and
    wherein the UPF communicates with a packet data network (PDN) using an N6 interface.

6. The method of claim 1,
    wherein the first alternate packet routing node comprises a packet data network gateway (PGW) node or a PGW user plane function (PGW-U) node;

wherein the network repository comprises a domain name system (DNS) server; wherein the session management node comprises a PGW control plane function (PGW-C) node or a serving gateway (SGW); and wherein the PGW communicates with a packet data network (PDN) using an SGi interface.

7. A system for establishing a data traffic session for a user equipment (UE) on a network, the system comprising:
a processor; and
a computer-readable medium storing instructions that are operative upon execution by the processor to:
receive, by a session management node, from the UE, a request to set up the data traffic session;
establish the data traffic session with a first packet routing node;
receive, by the session management node, from a network repository or the first packet routing node, an indication of unavailability of the first packet routing node to handle UE data traffic;
based on at least a status of the first packet routing node changing from available to handle UE data traffic to unavailable to handle UE data traffic, move the data traffic session to an available first alternate packet routing node;
monitoring a service performance between the first alternate packet routing node and a packet data network (PDN); and
based on at least the service performance between the first alternate packet routing node and the PDN meeting a performance threshold, indicating, by the first alternate packet routing node, to the network repository, the availability or unavailability of the first alternate packet routing node to handle UE data traffic.

8. The system of claim 7, wherein the indication of unavailability of the first packet routing node to handle UE data traffic is received from the network repository.

9. The system of claim 7, wherein the indication of unavailability of the first packet routing node to handle UE data traffic is received from the first packet routing node.

10. The system of claim 7, wherein indicating the availability or unavailability of the first alternate packet routing node to handle UE data traffic comprises:
based at least on the first alternate packet routing node being available to handle UE data traffic:
registering the alternate first packet routing node with the network repository, or
registering the first alternate packet routing node with the network repository with an availability flag; and
based at least on the first alternate packet routing node being unavailable to handle UE data traffic:
de-registering the first alternate packet routing node with the network repository, or
registering the first alternate packet routing node with the network repository with an unavailability flag.

11. The system of claim 7,
wherein the first alternate packet routing node comprises a user plane function (UPF) node;
wherein the network repository comprises a network function repository function (NRF) node;
wherein the session management node comprises a session management function (SMF) node; and
wherein the UPF communicates with a packet data network (PDN) using an N6 interface.

12. The system of claim 7,
wherein the first alternate packet routing node comprises a packet data network gateway (PGW) node or a PGW user plane function (PGW-U) node;

wherein the network repository comprises a domain name system (DNS) server;
wherein the session management node comprises a PGW control plane function (PGW-C) node or a serving gateway (SGW); and
wherein the PGW communicates with a packet data network (PDN) using an SGi interface.

13. One or more computer storage devices having computer-executable instructions stored thereon, which, upon execution by a computer, cause the computer to perform operations comprising:
receiving, by a session management node, from a UE, a request to set up a data traffic session;
establishing the data traffic session with a first packet routing node;
receiving, by the session management node, from a network repository or the first packet routing node, an indication of unavailability of the first packet routing node to handle UE data traffic;
based on at least a status of the first packet routing node changing from available to handle UE data traffic to unavailable to handle UE data traffic, moving the data traffic session to an available first alternate packet routing node;
monitoring a service performance between the first alternate packet routing node and a packet data network (PDN); and
based on at least the service performance between the first alternate packet routing node and the PDN meeting a performance threshold, indicating, by the first alternate packet routing node, to the network repository, the availability or unavailability of the first alternate packet routing node to handle UE data traffic.

14. The one or more computer storage devices of claim 13, wherein the indication of unavailability of the first packet routing node to handle UE data traffic is received from the network repository.

15. The one or more computer storage devices of claim 13, wherein the indication of unavailability of the first packet routing node to handle UE data traffic is received from the first packet routing node.

16. The one or more computer storage devices of claim 13, wherein indicating the availability or unavailability of the first alternate packet routing node to handle UE data traffic comprises:
based at least on the first alternate packet routing node being available to handle UE data traffic:
registering the alternate first packet routing node with the network repository, or
registering the first alternate packet routing node with the network repository with an availability flag; and
based at least on the first alternate packet routing node being unavailable to handle UE data traffic:
de-registering the first alternate packet routing node with the network repository, or
registering the first alternate packet routing node with the network repository with an unavailability flag.

17. The one or more computer storage devices of claim 13,
wherein, based on a determination a network is a fifth generation cellular network:
the first alternate packet routing node comprises a user plane function (UPF) node;
the network repository comprises a network function repository function (NRF) node;
the session management node comprises a session management function (SMF) node;

the UPF communicates with a packet data network (PDN) using an N6 interface; and wherein, based on a determination a network is a fourth generation cellular network:

the first alternate packet routing node comprises a packet data network gateway (PGW) node or a PGW user plane function (PGW-U) node;

the network repository comprises a domain name system (DNS) server;

the session management node comprises a PGW control plane function (PGW-C) node or a serving gateway (SGW); and the PGW communicates with a packet data network (PDN) using an SGi interface.

* * * * *